Morris & Green.
Cultivator.

No. 69,928.        Patented Oct. 15, 1867.

Witnesses:
Jos. W. Byrnes
John A. Gilcox

Inventor:
E. J. Morris
R. J. Green
per F. A. Morley
Attorney.

United States Patent Office.

E. F. MORRIS AND R. J. GREEN, OF CICERO, NEW YORK.

Letters Patent No. 69,928, dated October 15, 1867.

---

COMBINED HOE AND POTATO-DIGGER.

---

*The Schedule referred to in these Letters Patent and making part of the same.*

---

TO ALL WHOM IT MAY CONCERN:

Be it known that we, E. F. MORRIS and R. J. GREEN, of Cicero, in the county of Onondaga, and State of New York, have invented a new and improved Corn-Hoe and Potato-Digger combined; and we do hereby declare that the following is a full, clear, and exact description thereof, which will enable those skilled in the art to make and use the same, reference being had to the accompanying drawings, forming part of this specification, in which—

Similar letters of reference indicate corresponding parts in all the figures.

This invention relates to a new and improved farming implement, having such construction and combination of parts as to be adaptable for cultivation of plants or for potato-digging, as hereinafter explained.

Figure 1:
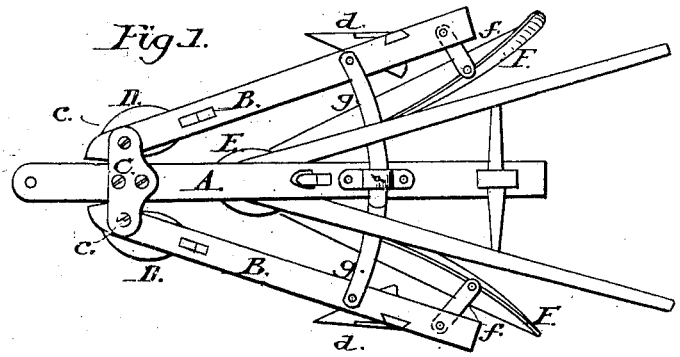
Figure 1 is a plan view of our invention.
Figure 2:
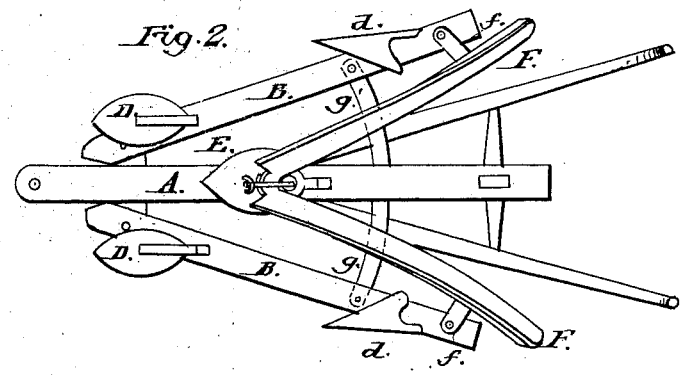
Figure 2 is a bottom view of the same.
Figure 3:
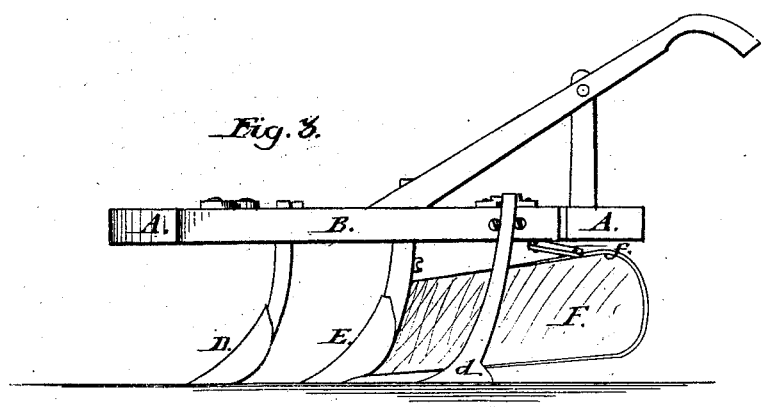
Figure 3 is a side elevation.

In the accompanying drawings, A is the main beam of the implement, to each side of which is hinged or pivoted a beam, B. These side beams B are attached to the main beam A by a cross-head, C, and pivots $c\ c$, fig. 1, so that their rear ends are adjustable laterally for changing the width or spread of the implement. Each of the side beams has a shovel-plough, D, on its front end, and a small mould-board plough, $d$, near its rear end. To the centre of the main beam A is attached a shovel-plough, E, and to the rear side of this plough are pivoted the front ends of a pair of wings, or mould-boards, F F. These wings extend to the rear, and diverge laterally, so that, with the shovel E, they form a large double mould-board plough. The rear ends of the wings F are attached to the side beams B by links $f$, and thus we obtain a yielding connection, which is necessary, as the beams B and wings F have separate centres of motion. The rear ends of the wings and side beams are secured at the desired distance from each other by curved braces $g\ g$, the said braces being secured to the centre beam A in an adjustable manner by a pin or set-screw.

Its operation is as follows: For a first hoeing the wings F F and centre shovel E are removed; but when the plants are grown up, and are ready for the second hoeing, then all the parts are used, as shown. The leading shovels D D and shovel E break up and loosen the ground, the small side ploughs $d\ d$ cut up the grass and weeds close to the drill, and throw them within reach of the ploughs or wings F, so they are covered with earth. After the leading ploughs have prepared the way, the wide mould-boards F clean up all the weeds and cover them up, and deposit soft ground on either side about the plants. The width of the machine being variable, more or less earth is thrown upon the plants, as desired. When used as a potato-digger, the front shovels D D and side ploughs $d\ d$ are removed; and the shovel E passing under the centre of the drill, it is taken up and divided, and the wings F F overturn the divided drill and leave it bottom up, on each side of the furrow, so that the potatoes are exposed and easily gathered.

Having thus described our invention, what we claim as new, and desire to secure by Letters Patent, is—

We claim the swinging beams B, and shares or wings F, connected with yielding links $f\ f$, in connection with ploughs D $d$, frame A, and braces $g$, all constructed, arranged, and operating as herein shown and for the purpose set forth.

The above specification of our invention signed by us this 15th day of April, 1867.

E. F. MORRIS,
R. J. GREEN.

Witnesses:
HARRY GIFFORD,
THEO. L. DEAN.